March 7, 1967   W. H. CARRIGAN ET AL   3,308,213
VACUUM FORMING DIE AND METHOD
Filed May 27, 1963   2 Sheets-Sheet 1

INVENTORS
WILLIAM H. CARRIGAN
ROBERT E. O'BRIEN
BY
ATTORNEYS

March 7, 1967    W. H. CARRIGAN ET AL    3,308,213
VACUUM FORMING DIE AND METHOD
Filed May 27, 1963    2 Sheets-Sheet 2

INVENTORS
WILLIAM H. CARRIGAN
ROBERT E. O'BRIEN
BY
*Price & Heneveld*
ATTORNEYS

United States Patent Office 3,308,213
Patented Mar. 7, 1967

3,308,213
VACUUM FORMING DIE AND METHOD
William H. Carrigan and Robert E. O'Brien, Grand Rapids, Mich., assignors to Kirkhof Manufacturing Corporation, Grand Rapids, Mich., a corporation of Michigan
Filed May 27, 1963, Ser. No. 283,311
8 Claims. (Cl. 264—90)

This invention relates to a pressure forming die, and more particularly to a pressure differential forming die for forming vented plastic lids for containers from a plastic sheet.

Due to recent developments in plastic technology and to economy in production of certain plastics, it is now feasible to provide disposable plastic lids or covers for disposable paper or plastic containers. When using such covers on hot liquid containers, the plastic lid seals to the cup edge, preventing heat loss and liquid spillage. Since, however, hot liquid is accompanied by considerable vapor constantly evaporated from the surface, the plastic caps must be vented to release this vapor. Normally, these vents are made by puncturing with tool caps that have been formed previously and stacked. This necessarily adds labor and equipment costs to the relatively inexpensive disposable caps, to thereby add a considerable fraction to their total cost. Naturally, the holes cannot be punctured into the lid when it is being formed by a pressure differential since the punctures would cause air leakage across the plastic sheet being formed, thereby destroying the seal and preventing formation of the lid details. This is orthodox teaching in the art.

The inventors, herein, however, wishing to remove the added costs involved in the extra lid puncturing step, disregard this orthodox teaching and employed the heretical concept of actually piercing the holes in the lid simultaneously with the pressure forming process. They used the forming pressure differential across the plastic sheet also as the force for impaling the plastic sheet on puncturing needles simultaneously with the formation of the details of the lid. This, therefore, is the primary object of this invention. This significant change necessarily eliminates the added puncturing step with its concomitant expense. The completed lid is formed in one rapid process from the initial plastic sheet material. It has been found that the venting orifices can be pierced through a large number of simultaneously formed lids during pressure forming without significant air leakage. The fine details of the lid, including the delicate sealing edge, are completely and properly formed without difficulty.

It is another object of this invention to provide a novel method of pressure forming a plastic lid wherein the forming step of the lid is achieved simultaneously with a piercing step both using the same pressure differential across the plastic sheet.

These and other objects of this invention will be apparent upon studying the following specification in conjunction with the drawings in which.

Basically, the inventive forming die for vacuum forming container lids comprises a peripheral means for holding and sealing a plastic sheet against the lower platen, and preferably for later creasing the sheet to segregate the formed lid, die forming means inside the peripheral means for applying a pressure differential across the plastic sheet and including a forming face and a plurality of needle elements projecting from the face from generally horizontal surfaces preferably not at right angles to the plastic sheet to be formed.

The inventive method of forming the vented plastic container lid comprises the steps of holding and sealing the periphery of a plastic sheet portion, positioning a die face pattern and at least one needle projection adjacent the sheet, applying a pressure differential across the sheet including a vacuum between the sheet and die to form the sheet against the pattern and simultaneously cause it to be pierced by impaling it on the needle projections, creasing the periphery of the sheet portion to form the lid boundary and reversing the pressure differential to eject the lid from the pattern and slide it off the needle projections.

Figure 1:
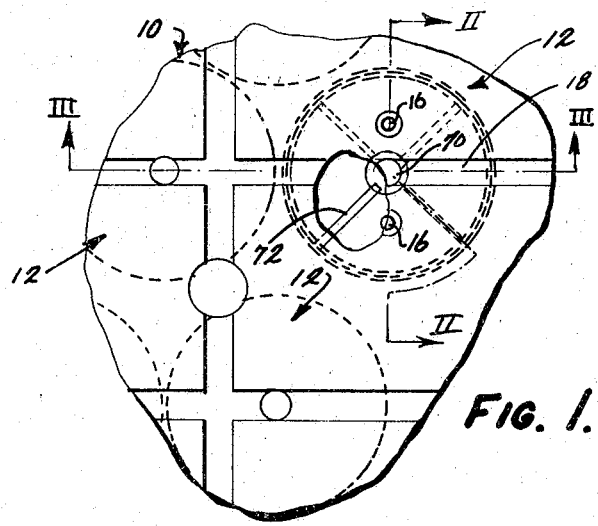
FIG. 1 is a fragmentary plan view of an upper platen of a die forming press showing a plurality of individual lid forming dies mounted therebeneath.
Figure 2:
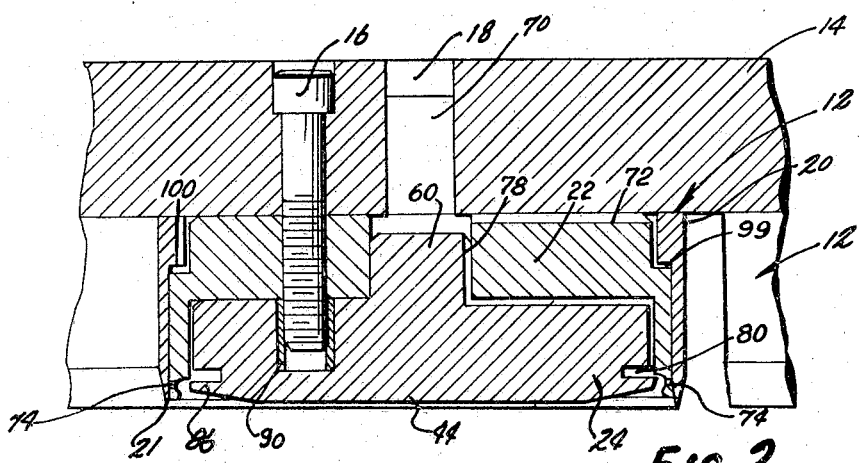
FIG. 2 is a sectional view taken on lines II—II in FIG. 1.

Referring now specifically to the drawings, in FIG. 1 a fragment of the multiple part, e.g. a 40-up forming die is shown. Such a die normally includes a large number of identical die sections, only a few of which are shown in FIG. 1 and only one in detail to simplify the drawings as much as possible. Thus, in the entire die 10 each of the die assemblies 12 is mounted to the common support plate 14 (FIG. 2) by bolts or studs 16. The support plate is then attached by suitable means (not shown) into the head of the press for reciprocation of the several die assemblies 12 simultaneously toward and away from the lower pressure plate 17. The upper die plate includes passageways 18 which are normally sealed from the atmosphere and communicative to a vacuum and pressure source when support plate 14 is installed in the head of a press, so that they can be evacuated to evacuate the face of the individual dies in a manner to be explained hereinafter. The lower pressure plate 16 is preferably porous to enable air to be blown up through it or evacuated from it to provide optimum pressure differential conditions across the plastic sheet between the lower pressure plate and upper mold elements. The lower pressure plate is also preferably heated so that the plastic sheet material can be brought to an elevated working temperature before the formation step.

Figure 6:
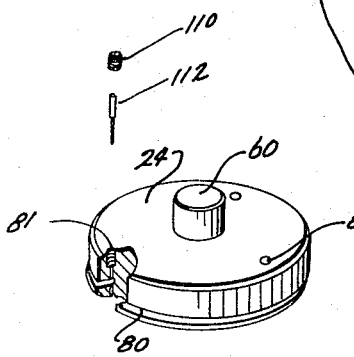
FIG. 6 is a perspective view of a plastic lid formed from the die in FIGS. 1 through 5.
Figure 6:
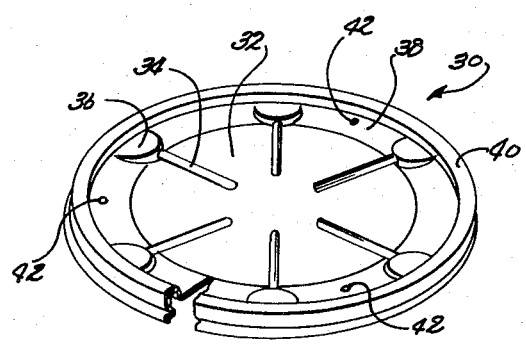

Each of the die assemblies 12 is composed of interfitting parts, namely the peripheral holding, sealing and creasing sheath 20 having a dull blade 21, the outer die collar 22, and the inner die plug 24. The die collar and inner plug may be formed of one piece instead of two pieces bolted together. Machining is simpler with two pieces. The inner forming die 24 includes a lower face having negative surface details to be formed in the container lid. The negative pattern on the inner and outer die inserts of the die assembly 12 cooperate to form the typical lid construction shown as by lid 30 in FIG. 6. This lid includes a central flat portion 32, preferably having reinforcing ribs 34 extending radially outwardly and terminating in the flat plateaus 36. Between the spaced plateaus 36 are a plurality of tapered or angular surfaces 38 which are at an acute angle with respect to the central surface 32 to reinforce the edge of the lid. On the terminal periphery of the lid is a curled sealing flange 40. In surfaces 38 is a plurality of venting orifices 42, here shown to be three in number.

The negative face pattern on the die assembly 12 to form this lid includes a flat central area 44 having radially projecting channels 46 to form ribs 34, angular edge portions 48 between flat forming sections for plateaus 36, and a peripheral cavity 50 formed partially in the inner surface of the outer die 22 and partially in the outer surface of the inner die 24 to form the lid seal edge 40.

To assure alignment between the inner and outer die elements 22 and 24, the inner element is provided with a central cylindrical projection or post 60 interfitting with a corresponding cylindrical cavity 62 in the outer upper die 22.

Figure 3:
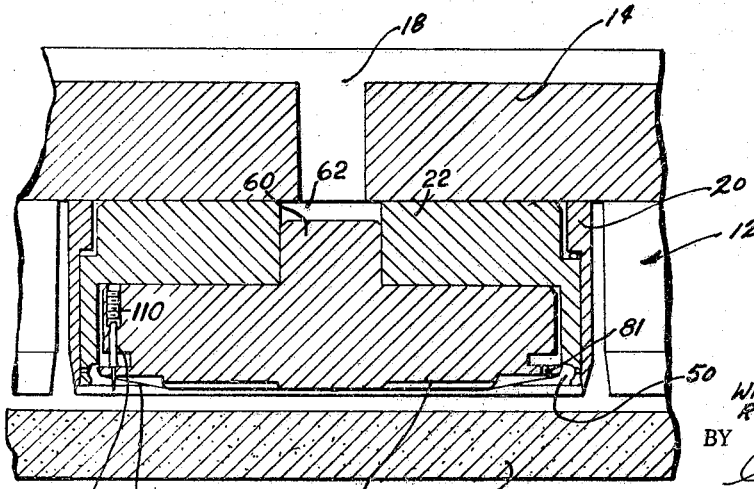
FIG. 3 is a sectional view taken on lines III—III of FIG. 1.

Air passageways from the main conducting passageway 18 on support 14 are provided to all portions of die assembly 12 through gate 70. A plurality of radially extending passageways 72 on the upper surface of the outer upper die 22 communicate to the space between die 22 and sleeve 20 to allow suction to be applied through tiny orifices 74 around the entire periphery of the lid forming portion at small spaced intervals. Also, a plurality of passageways 78 extend axially down the peripheral surface of projection or stem 60 and radially across the top of the inner lower plug insert die 24 to communicate around the periphery of the inner plug to the annular groove 80 in the lower part of inner die 24 adjacent the portion of the die for forming the lid edge. This groove 80 serves to conduct air from the area of the die forming the flats or plateaus 36 due a plurality of tiny orifices 81 (FIG. 3) through the lower flange 86 beneath the groove 80.

Figure 4:
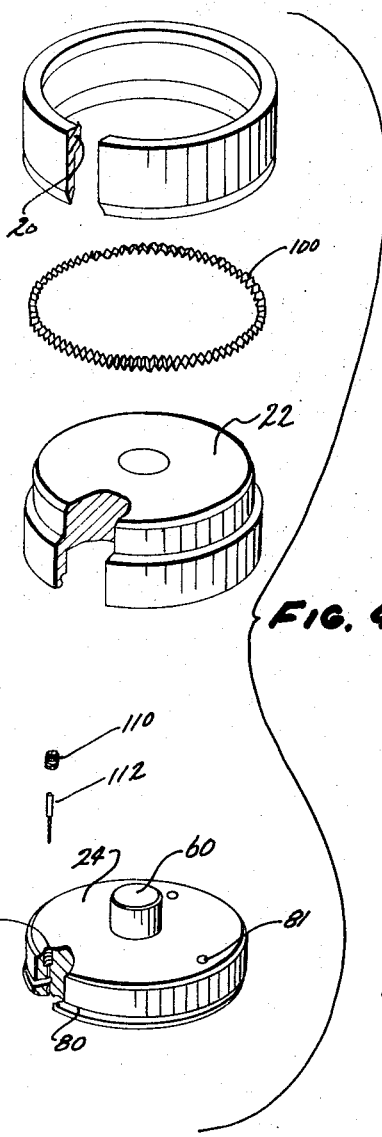
FIG. 4 is an exploded view of one of the die assemblies.

When the bolts 16 are connected through the support 14 and into the drilled, tapped receiving opening 90 in the inner dies 24, the inner dies thus align and rigidly support the outer die above it against the base of support 14. Since the dies are formed of very hard steel, the tapped socket 90 may be formed by an insert if desired. The collar 20 is retained on the die assembly by the interfitting horizontal shoulders 99 between the outer die 22 and collar 20. A limited amount of flexibility is provided between the collar and the outer upper die. A small amount of clearance must exist between the lower edge of the peripheral blade on the collar 20 and the face of the die. If the face of the die is too low, the blade edge cannot seal against the plastic sheet properly. It was found that if the shoulders 99 were machined to a contacting relationship, tolerances could not be conveniently held accurately enough to assure the very tiny, but definite clearance between the sealing edge of sheath 20 and the die face. Thus, a definite clearance is provided between the interfitting shoulders of these elements. It was discovered, however, that when sleeve 20 is provided with "play" with respect to the die so that it can ride up and down a small amount of the die as the sharp edge moves into contact and out of contact with the plastic sheet on the lower platen, the lid formed will not release properly from the die assembly. By inserting a resilient spacer means 100 preferably in the form of a zig-zag spring element (FIG. 4), the needed clearance at the bottom of the die assembly is always obtained, and there is no play of the collar causing the lids to hang up in the die after formation. The lower sealing 21 edge on this holding element 20 is not real sharp, but purposely has a blunt edge a few thousandths of an inch in width to obtain optimum sealing and also cause the device to only crease the plastic after the lid is formed instead of cutting it clear through as explained more fully hereinafter.

Figure 5:
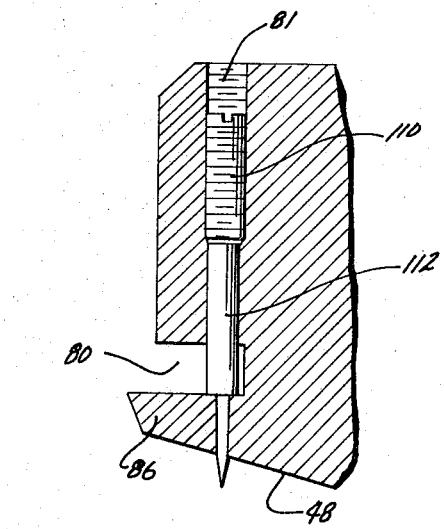
FIG. 5 is an enlarged fragmentary view of a portion of one of the die assemblies showing the mounting of one of the piercing needles.

In the inner die 24, a plurality of one or more tiny holes are vertically drilled at spaced intervals around the plug (FIG. 5). The upper end of each of these holes is tapped to receive a retention screw 110. The lower end of each hole is drilled through to the groove 80 with a diameter of, for example about 1/16 of an inch.

Beneath groove 80, i.e. in the flange 86, the hole is concentric with the one above the groove but is substantially smaller, for example about 0.035 inch. The drilled hole receives a set screw 110 and a needle projection 112. This needle projection includes an upper larger diameter shoulder portion adapted to fit in the larger diameter portion of the hole beneath the set screw and rest upon the lower edge of groove 80, while the smaller needle portion projects through the opening in the flange 86 and out through tapered surface 48. It must not project beneath the level of the peripheral blade edge on element 20, but normally projects to the plane including the bottom of face 44.

The plurality of needle elements and set screws are inserted in the inner plug before it is assembled in the outer, upper die collar. Both are then assembled into the peripheral sheath which acts as the holding and sealing element, with the spring 100 therebetween. The entire assembly is then attached to support 14 by bolts 16 in a multiple unit fashion. The support is then fastened in an air sealed manner into the head of a press to form the upper platen.

It will be noted that the projecting sharp end of each needle is shown to protrude through the lower face of the die at angular portion 48, rather than at the portion forming flat 36 on lid 30. This location of the needle in this particular position has two advantages which are not readily apparent. Firstly, it has greater projecting length without extending beyond the knife edge 21 of element 20. Secondly, the flat sheet portion which forms adjacent the needle is being shifted to a plane at an angle with respect to the rest of the sheet. It thus moves a tiny amount across the sharp end of the needle as the plastic shifts from one plane to the other, to assure puncturing or piercing of the sheet by the needle as it is pulled across, rather than mere flexing and formation of the plastic around the needle without puncturing. Vent hole piercing needle or needles 112 could also be located on a perpendicular surface, provided adequate space is allowed between bottom face of inner plug 44 and pressure plate 16 to allow the needle to project a substantial and significant distance without contacting pressure plate 16, i.e. without projecting past knife edge 21. The amount of needle that must project out the face of the die to puncture the sheet material varies with the type of material involved. Usually, it is about 3/16" to 1/4" for example. Sometimes it is desirable to form a recess dome in the die around the needle point to achieve proper needle protrusion and action.

*Operation*

In forming lid 30 from a continuous plastic sheet, the sheet is conveyed between the upper die and lower pressure plate of a forming press when they are spaced from each other, so that each of the die assemblies 12 can simultaneously form a punctured lid. Since the operation of each of the die assemblies is the same, it will be described only with respect to one die assembly.

After the lid is in position between upper and lower platens, and assuming the lower platen or pressure plate 16 is heated to a suitable temperature depending upon the plastic material involved, the upper die including support 14 and the plurality of die assemblies 12 is lowered, so that the blunt knife edge 21 of each element 20 both holds and seals a portion of the plastic sheet. Compressed heated air is then exerted through passageways 18, 70, 72, 74, 78 and 80 to the face of the die while air is evacuated from beneath the die at the same time to shift the sheet momentarily into contact with the hot lower platen 16. After a short time interval sufficient to bring the sheet to proper forming temperature, the pressure differential is reversed, i.e. the air above the sheet in the die assembly is evacuated, while hot air is forced through the porous lower pressure plate to force the plastic sheet into the face pattern of the dies. As the plastic is drawn upwardly against each die, the rib channels 46 form reinforcing ribs 34, and plastic peripheral portions bend up around the angular edge of the die to form angular surfaces 38. Simultaneously, with this movement the pressure differential causes the plastic to be impaled on the sharp needle points which project below the surface of the die, to thereby puncture the plastic in one or several places. It has been found that this does not substantially effect the pressure differential across the plastic sheet, since the soft, punctured plastic quickly seals around the needles. The very edge of the plastic then forms up around the lid edge portion of the dies to form edge 40. Thereafter, the upper platen is lowered a small fraction of an inch more, but less than the thickness of the plastic sheet to cause the blunt knife edge 21 on element 20 to crease the plastic around each of the formed lids, but not entirely cut them out. Then the pressure differential is again reversed to eject the formed lids from the dies and simultaneously slide them off the needle elements, so that in one operation the completed vented plastic sealing lids are formed. The lids and sheet matrix are conveyed out of the press. The lids are then broken out of the plastic sheet matrix by conducting them around a sharp roller to break them loose. Certain of these incidental features to this invention are disclosed and claimed in U.S. patent application, Serial No. 160,057, filed December 18, 1961, now Patent No. 3,166,790, entitled Forming Press, and assigned to the assignee herein.

Various obvious modifications of the structural elements in the preferred form shown to suit a particular purpose may readily be achieved without departing from the principles of the invention as taught. These obvious modifications are deemed to be part of this invention, which is to be limited only by the scope of the appended claims and the reasonably equivalent structures to those defined therein.

We claim:

1. A pressure differential forming die for plastic container lids comprising: peripheral means for holding and sealing a plastic sheet against a lower pressure plate; die forming means including means for applying a pressure differential across said plastic sheet to force it against said forming means; and pointed, sheet puncturing needle elements projecting from said forming means and thus toward said sheet within the area of said forming means, but terminating short of said peripheral means and adapted to puncture said sheet when said sheet is forced toward said forming means.

2. A pressure differential forming die for plastic container lids comprising: peripheral means for holding and sealing a plastic sheet against a lower pressure plate; die forming means including means for applying a pressure differential across said plastic sheet to force it against said forming means; and pointed sheet puncturing needle elements projecting from said forming means and adapted to puncture said sheet as it is forced against said forming means without relieving said pressure differential; said needles being oriented with respect to said forming means so as to be non-perpendicular to the punctured plastic sheet portions as formed.

3. A pressure differential forming die for plastic container lids comprising: peripheral means for holding and sealing a plastic sheet against a lower pressure plate; die forming means; and pointed sheet puncturing needle elements projecting from surfaces of said forming means, and so oriented with respect to said surfaces as to be arranged non-perpendicular to the adjacent sheet portions when forced against said forming means without relieving said pressure differential.

4. A pressure differential forming die for plastic container lids comprising: an annular peripheral sheath having a blunt knife edge for sealing against a lower pressure plate a plastic sheet to be formed and for subsequently creasing the sheet after a lid is vacuum formed; a forming die slidably fitted inside said sheath and adapted to be rigidly secured to a support; said die including a forming face, and passageways thereto to allow a pressure differential to be applied across a plastic sheet; spaced adjacent shoulders on said die and the inside of said sheath to retain said sheath on the die assembly; resilient spacer means between said shoulders to control movement therebetween; and pointed sheet puncturing needle elements projecting from the face of said die to puncture said sheet when a pressure differential forces said sheet against said face for forming; said projecting elements being on portions of said face which are not parallel to the sheet before die forming.

5. A pressure differential forming die comprising: a die having two interfitting sections defining a face and passageways thereto; the first portion extending peripherally of and above the second portion; said second portion having openings therein adapted to receive and support shouldered needles in a manner causing the needle points to protrude from the face of said second portion; shouldered needles retained in said openings and a separate collar around the periphery of said second portion having a continuous edge adapted to seal a plastic sheet against a lower platen and subsequently crease the sheet around the article formed.

6. A pressure differential forming die assembly comprising: a support having a plurality of forming dies mounted thereto; each of said dies including a peripheral holding and sealing element for a plastic sheet to be formed; a die plug inside said element including a forming face and passageways thereto to create a controlled pressure differential across a plastic sheet, a plurality of sockets extending through said plug means to the face thereof, with the opening at the face being smaller than other portions of each socket; a plurality of needles in said sockets, with enlarged body portions to interfit in said sockets and smaller portions with sharp points protruding out said face and terminating short of the lower terminus of the sealing element; and retention means locking said needles down in said sockets, whereby a pressure differential shifting a plastic sheet against said face also causes said needles to puncture said sheet in a controlled temporarily non-leaking manner.

7. A method of forming a plastic container lid for hot liquids to be vented, comprising the steps of: holding and sealing the periphery of an imperforate plastic sheet portion; positioning a face pattern and at least one pointed needle projection adjacent said sheet portion; applying a pressure differential to said sheet to force it against said pattern and simultaneously impale it on said needle projection to puncture a temporarily non-leaking orifice; and ejecting the formed sheet portion from said face while sliding it off said needle to provide a vented lid.

8. A method of forming a plastic venting container lid comprising the steps of: holding and sealing the periphery of a plastic sheet portion; positioning a face pattern having a plurality of pointed needle-like projections adjacent said sheet portion; heating said sheet portion; applying a pressure differential across said sheet portion to force it against said face pattern and simultaneously pierce it with said needle-like projections, while sealing the plastic around the needles; creasing the periphery of said portion to form the lid boundary; and reversing the pressure differential to eject said lid from said pattern and slide it off said needle-like projections.

References Cited by the Examiner

UNITED STATES PATENTS 3,225,461   12/1965   Snyder _____ 18—19

WILLIAM J. STEPHENSON, *Primary Examiner.*